Dec. 15, 1964  W. M. LUTTS, SR., ETAL  3,161,146
LONGITUDINAL SECTIONAL DOOR OPERATING SHAFT
Filed June 10, 1963  8 Sheets-Sheet 1
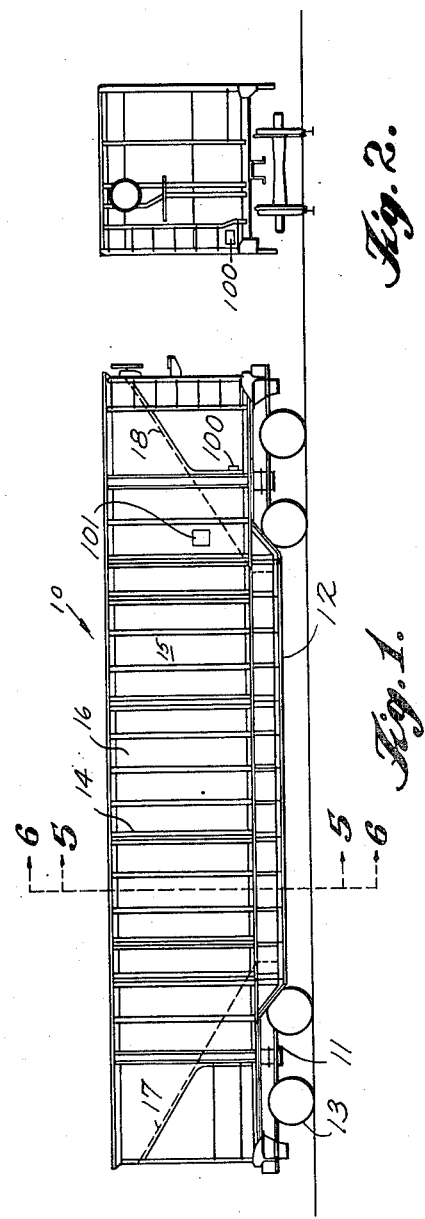
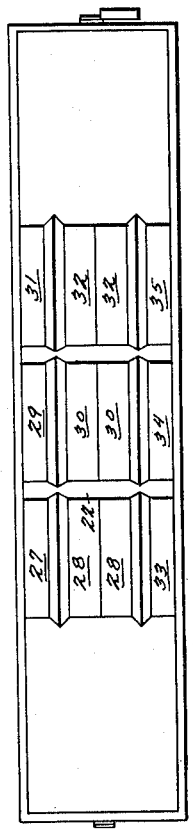
INVENTORS
WILLIAM M. LUTTS, SR.
LAWRENCE H. TALIAFERRO, SR.
BY
Cushman, Darby & Cushman
ATTORNEYS

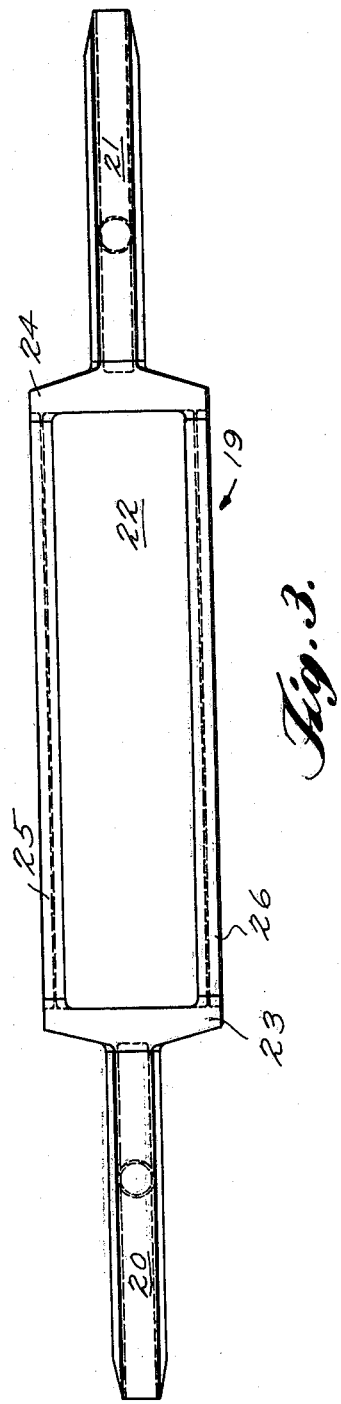

Dec. 15, 1964    W. M. LUTTS, SR., ET AL    3,161,146
LONGITUDINAL SECTIONAL DOOR OPERATING SHAFT
Filed June 10, 1963    8 Sheets-Sheet 3

INVENTORS
WILLIAM M. LUTTS., SR.
LAWRENCE K. TALIAFERRO., SR
BY
Cushman, Darby & Cushman
ATTORNEYS Dec. 15, 1964  W. M. LUTTS, SR., ETAL  3,161,146
LONGITUDINAL SECTIONAL DOOR OPERATING SHAFT
Filed June 10, 1963  8 Sheets-Sheet 4

INVENTORS
WILLIAM M. LUTTS, SR.
BY LAWRENCE K. TALIAFERRO, SR.

Cushman, Darby & Cushman
ATTORNEYS

Dec. 15, 1964 W. M. LUTTS, SR., ETAL 3,161,146
LONGITUDINAL SECTIONAL DOOR OPERATING SHAFT
Filed June 10, 1963 8 Sheets-Sheet 6

INVENTORS
WILLIAM M. LUTTS, SR.
LAWRENCE K. TALIAFERRO, SR.
BY
Cushman, Darby & Cushman
ATTORNEYS Dec. 15, 1964   W. M. LUTTS, SR., ETAL   3,161,146
LONGITUDINAL SECTIONAL DOOR OPERATING SHAFT
Filed June 10, 1963   8 Sheets-Sheet 7

INVENTORS
WILLIAMS M. LUTTS, SR.
LAWRENCE K. TALIAFERRO, SR.
BY
Cushman, Darby & Cushman
ATTORNEYS

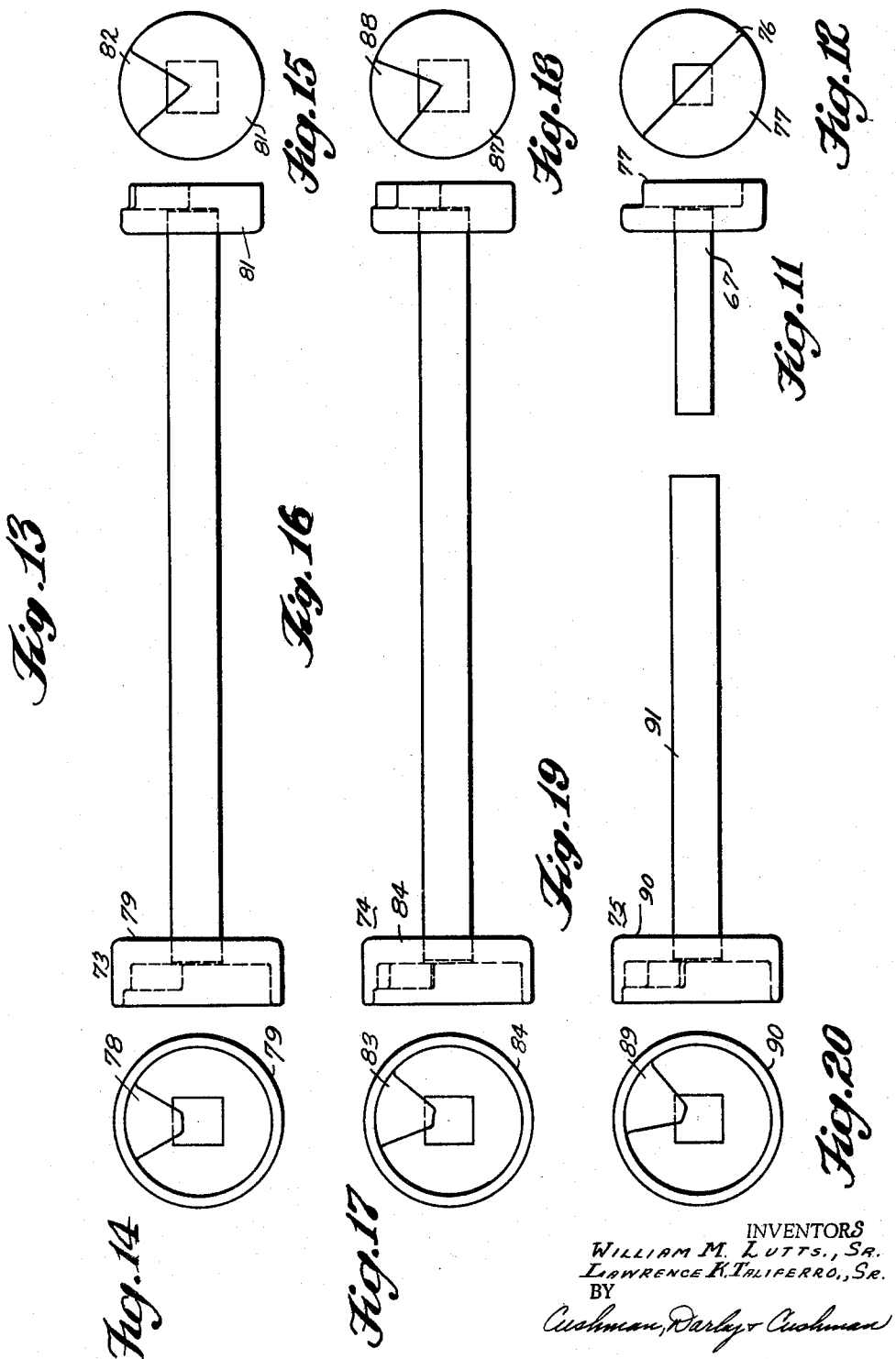

United States Patent Office 3,161,146
Patented Dec. 15, 1964

3,161,146
LONGITUDINAL SECTIONAL DOOR OPERATING SHAFT
William M. Lutts, Sr., and Lawrence K. Taliaferro, Sr., Louisville, Ky., assignors to Louisville and Nashville Railroad Company, a corporation of Kentucky
Filed June 10, 1963, Ser. No. 286,852
12 Claims. (Cl. 105—240)

This invention relates broadly to railway car construction and more particularly to an improved hopper car provided with a door operating mechanism including suitable lost motion devices which permit operation of the doors substantially by the force of gravity, thus relieving essentially all of the burden heretofore placed on motorized door operators in effecting the opening of the doors.

Conventional hopper-type cars generally are provided with door opening mechanisms that usually require considerable time to lock and unlock and are obviously disadvantageous when automatic and rapid unloading of the car is desired.

It is, therefore, a primary object of this invention to provide a door operating mechanism for railway cars, particularly hopper-type cars which will permit locking and unlocking of the doors in a quick and efficient manner so as to permit rapid, automatic unloading of the car's lading even while in motion and at the same time relieve substantially any burden required of door operators in effecting opening of the doors.

Other objects and attending advantages will be pointed out in the course of the detailed description relating to a preferred embodiment of the invention, the same being disclosed in the accompanying drawings in which:

FIGURE 1 is a side elevation view of a hopper car embodying the invention;

FIGURE 2 is an end view of the hopper car;

FIGURE 3 is a plan view of the underframe structure of a car especially suitable for use with the instant invention;

FIGURE 4 is a plan view of the hopper car showing a preferred door arrangement with which the instant invention is associated;

FIGURES 11 and 12 show a side view and end view respectively of the first section of the door operating shaft on which is mounted the male portion of the first door operating shaft coupling;

FIGURES 13, 14 and 15 show a side view and end views respectively of the second section of the door operating shaft on the left end of which is mounted the female portion of the first door operating shaft coupling and on the right end of which is mounted the male portion of the second door operating shaft coupling;

Figure 5:
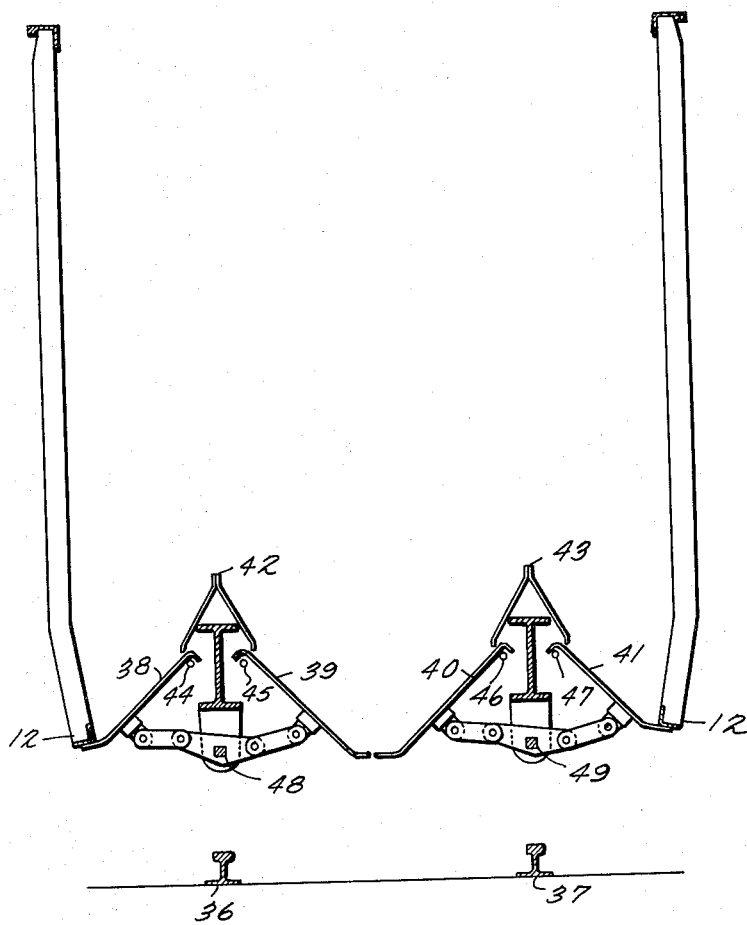
FIGURE 5 is a sectional view of the car taken on line 5—5 of FIGURE 1, showing the preferred underframe and door arrangement (closed) with which ths instant invention is associated.

FIGURES 16, 17 and 18 show a side view and end views respectively of the third section of the door operating shaft on the left end of which is mounted the female portion of the second door operating shaft coupling and on the right end of which is mounted the male portion of the third door operating shaft coupling; and FIGURES 19 and 20 show a side view and end view respectively of the fourth section of the door operating shaft on which is mounted the female portion of the third operating shaft coupling.

The instant invention is advantageously and preferably practiced in association with a hopper car of the type having an underframe construction and associated door arrangement described in application Serial No. 286,853, filed June 10, 1963, in the name of Julian F. Sapp, Sr., hereby incorporated by reference.

Referring now to the several views of the drawings and particularly to FIGURE 1 and FIGURE 2, the invention is embodied in a railway car 10 comprising side sill 11, side sill reinforcement 12, and supporting truck structures which include wheels 13 and other parts not shown. Side stakes 14 extend upwardly from side sill 11 and side sill reinforcement 12 and have secured to the inner faces thereof the side plates 15 which constitute the side walls of the hopper 16 in which materials are stored or shipped. This hopper is closed at its ends by preferably, sloped end plates 17 and 18 and is open at its top although a roof structure provided with filling hatches and hatch covers could be provided, if desired.

Referring now to FIGURE 3, the preferred form and structural arrangement of a vehicle underframe advantageously associated with this invention is generally indicated at 19 and consists of a pair of center draft sills 20 and 21, one at each end of the car 10, extending toward the longitudinal center of the car 10 just beyond the truck area. There is no center draft sill in the door area 22. The center draft sills 20 and 21 are headed off at the door area 22 by header sills 23 and 24, respectively. These header sills transmit impacts and other forces from the center draft sills 20 and 21 at the ends of the car to the intermediate sills 25 and 26 which are the main supporting members of the underframe of the car in the door area 22. This underframe structure makes it possible to arrange the doors under the car 10 so as to protect the rails from the lading when the doors are opened.

Referring to FIGURE 4, the door area 22 is provided with door openings 27–35 which are so arranged that when the doors are opened, the lading is spilled between and on both sides of the rails 36 and 37 of the track. The rails 36 and 37 of the track are directly under the intermediate sills 25 and 26 of the car.

Figure 6:
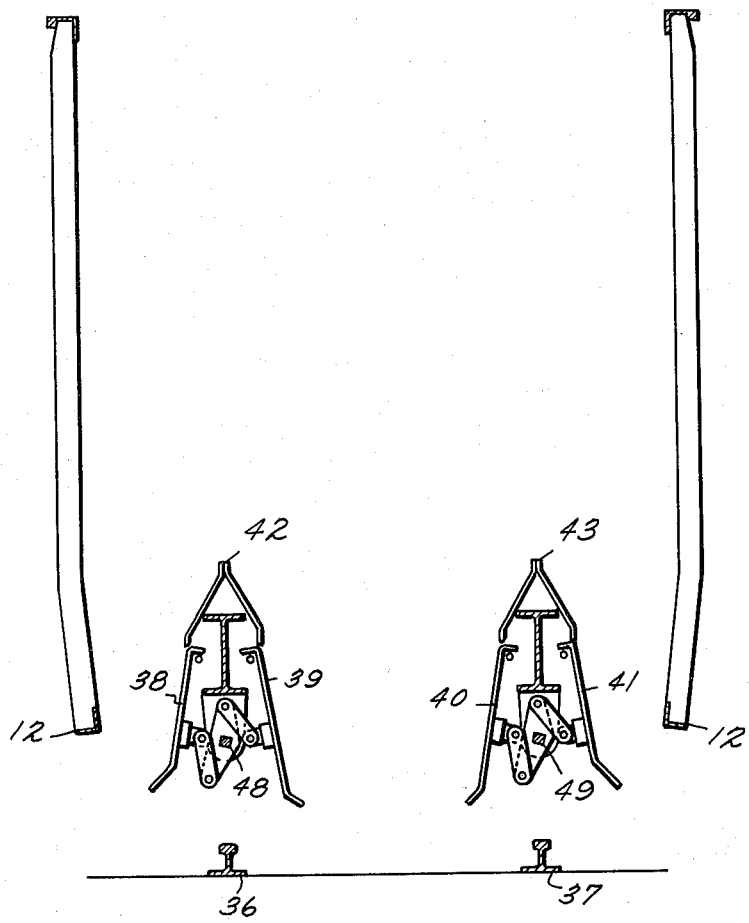
FIGURE 6 is a sectional view of the car taken on the line 6—6 of FIGURE 1 showing the preferred underframe and door arrangement (open) with which the instant invention is associated.

Referring now to FIGURE 5, doors 38, 39, 40 and 41 are provided for door openings 27, 28 and 33, respectively, it being noted that single opening 28 is provided with doors 39 and 40. Door openings 29, 30 and 34, as well as openings 31, 32 and 35 are similarly provided with door arrangements described above. The doors 38–41 are hinged to both sides of the intermediate sills 25 and 26, which are provided with sill caps 42 and 43, at points 44, 45, 46 and 47, respectively. The doors as shown are in the closed and locked position. The outside edge of the outside doors 38 and 41 close against the bottom of the side sill reinforcements 12 of the car while the center doors 39 and 40 close together. Rotation in a counterclockwise direction of door operating shafts 48 and 49, connected to doors 38–39 and 40–41, respectively, through a pair of levers with hinged lever arms, the extremities of which are hingedly secured to the doors, causes the doors to drop open and take the position shown in FIGURE 6 which illustrates more clearly the lading being dumped between and on the outside of the rails 36 and 37.

Figure 7:
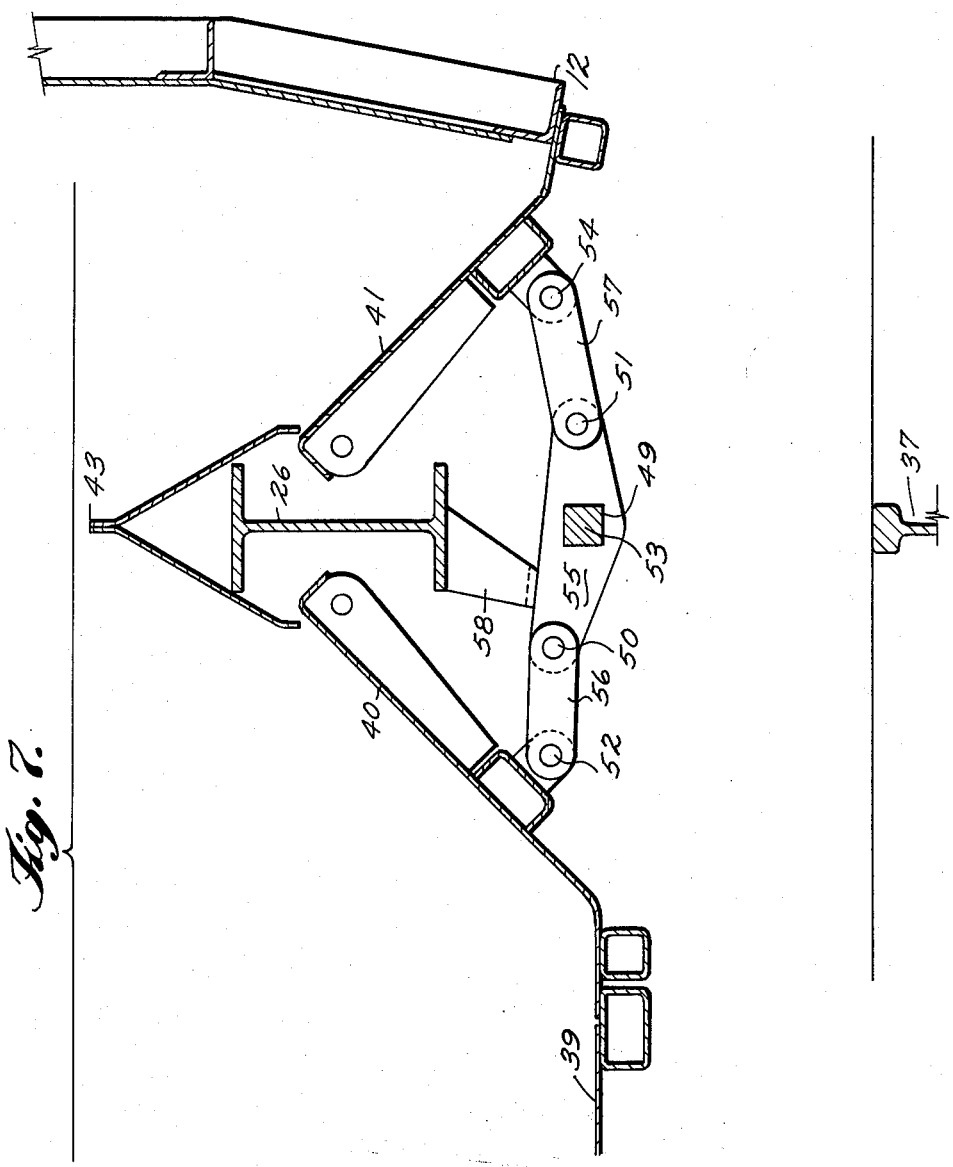
FIGURE 7 is an enlarged view of the door operating levers, shaft and doors in the closed and locked position which is shown on the right side of FIGURE 5.

As shown in FIGURE 7, the doors 40 and 41 are locked by means of hinge points 50 and 51, respectively, moving in the clockwise direction until it moves beyond the center line between the centers of the extreme hinged points, 52–53, and 53–54 of the lever 55 and lever arms 56 and 57. The weight of the doors 40 and 41 or the weight of the doors and the lading above the doors cause the lever 55 to be forced in the clockwise direction against the stop 58 which is secured to the underside of the intermediate sill 26. To unlock the doors 40 and 41 and drop them to the position shown in FIGURE 8, a counterclockwise rotation of shaft 49 moves hinge points 50 and 51 beyond the center line between the centers of the extreme hinged points 52–53, and 53–54 of the lever 55 and the arms 56 and 57, thus allowing the doors to fall open and assume the open position as shown in FIGURE 8.

Figure 8:
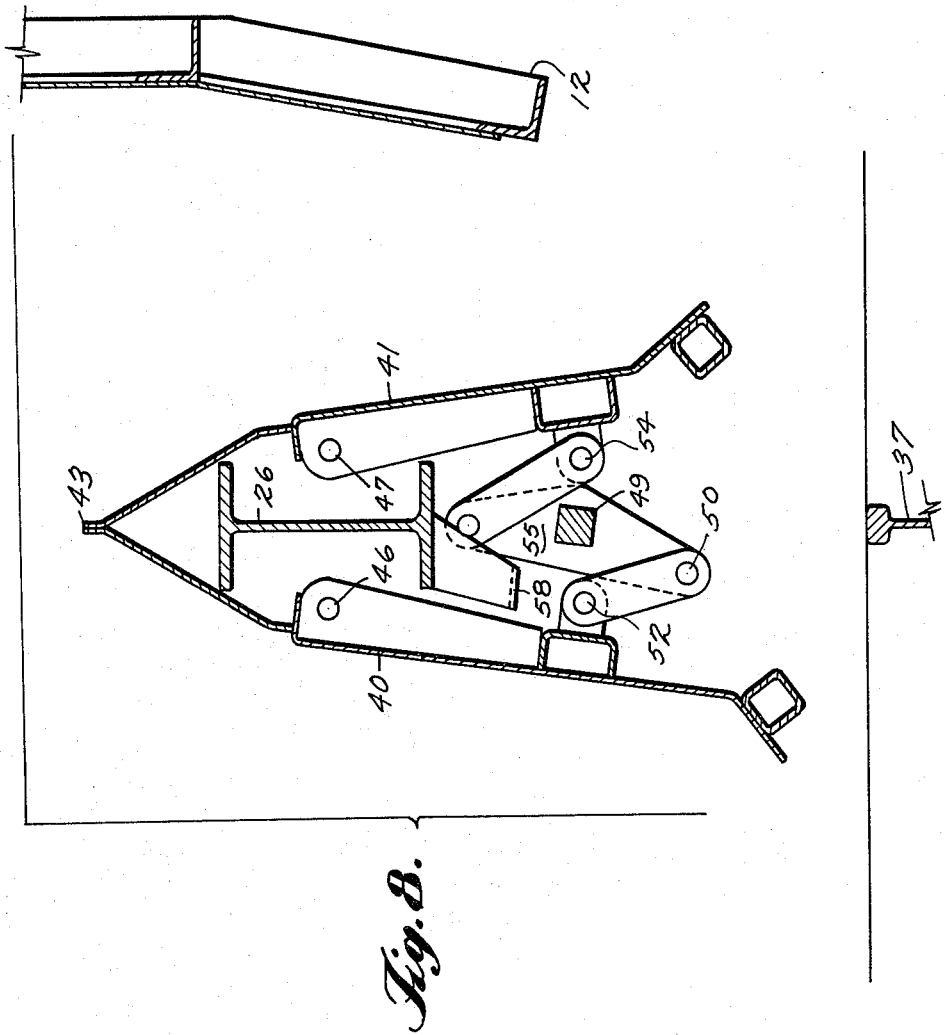
FIGURE 8 is an enlarged view of the door operating levers, shaft and doors in the open position which is shown on the right of FIGURE 6.
Figure 9:
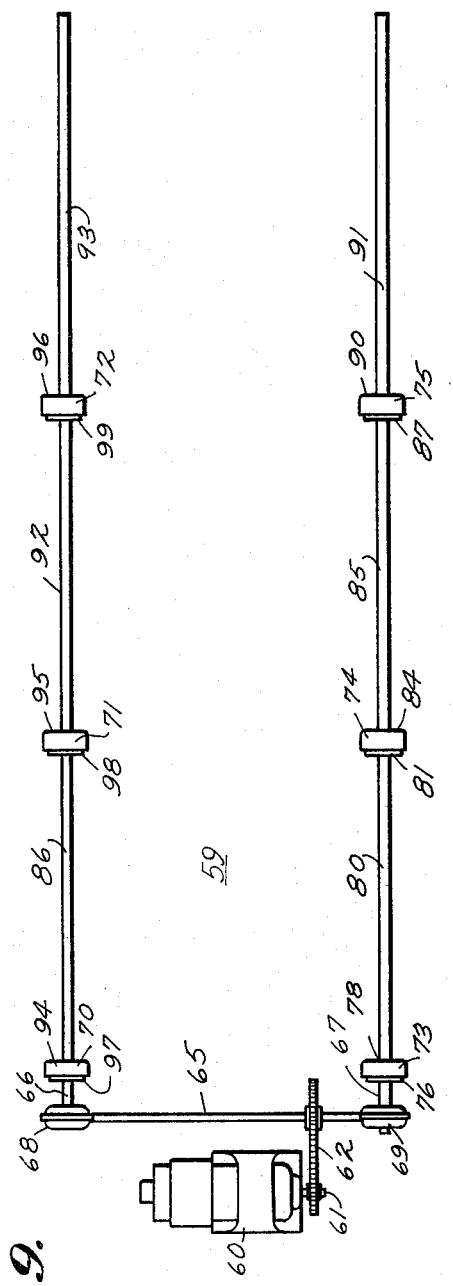
FIGURE 9 shows a plan view of the door operator linkage to the cross shaft, cross shaft, linkage to the door operating shaft and the four sections of the door operating shaft.
Figure 10:
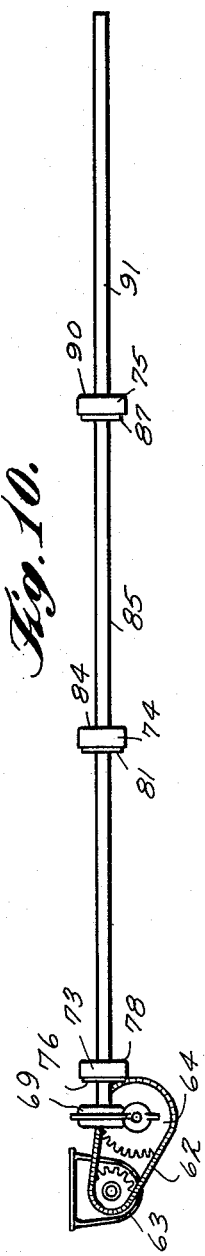
FIGURE 10 is a side view of FIGURE 9.

To close and lock the doors which are shown in FIGURE 8, a clockwise rotation of the door operating shaft 49 is effected thus moving hinge points 50 and 51 until they move beyond the center lines between the centers of extreme hinged points 52–53, and 53–54 of the lever 55 and arms 56 and 57. This then completes one full cycle of the door operation which starts with the doors in the closed and locked position and ends with them in the same position. The power required to unlock and open and close and lock the doors is supplied to the door operating lever 55 through the door operating shaft assembly 59 of this invention which is shown in FIGURES 9 and 10.

Referring now to FIGURES 9–20, the assembly 59 shows door operator 60 which furnishes power in the form of rotary motion to the door operator shaft 61. This rotary motion is transmitted throughout the door operating mechanism to effect the opening of the doors. To close the doors the direction of the rotation of the door operator 60 is reversed. From the door operator shaft 61 the power is transmitted by linkage 62, 63 and 64 to the cross shaft 65. The rotary movement of the cross shaft 65 is transmitted to the first sections of the door operating shaft 66 and 67 through a right angle linkage 68 and 69 which may be a conventional worm and gear, for instance. Thus, the movement of the first sections of the door operating shaft 66 and 67 is a rotary motion.

The four sectioned door operating shafts are arranged with a series of three shaft couplings, 70, 71 and 72 and 73, 74 and 75 on each shaft which allows sufficient slack in the mechanism so as to reduce the load on the door operator 60 by reason that only one-third of the hopper doors are unlocked by the door operator 60 at any one time, permitting the doors when so unlocked to fall open by the force of gravity and/or the lading above the door and not essentially by the operation of the door operator 60 and its associated linkage. As shown in FIGURE 9, the first section of the door operating shaft assembly 59 is shaft 67 which is arranged with the male portion 76 of the first door operating shaft coupling 73. On this male portion 76 there is a protrusion 77, as seen in FIGURES 11 and 12, which when rotated, contacts the pie-shaped protrusion 78, as shown in FIGURE 14, of the female portion 79 of the first door operating shaft coupling 73 which is on the driven end of the second section 80 of the door operating shaft assembly 59. After contact is made between the protrusions 77 and 78, the second section 80 of the door operating shaft assembly 59 rotates with the first section 67 causing door operating lever 55 to rotate, thus unlocking one-third of the hopper doors 38–41 of the car 10.

The second section 80 of the door operating shaft assembly 59, is arranged with the male portion 81 of the second door operating shaft coupling 74 on the driving end. This male portion 81 has a pie-shaped recess 82 as shown in FIGURE 15, which fits over the pie-shaped protrusion 83, as shown in FIGURE 17, in the female portion 84, of the second door operating shaft coupling 74 on the driven end of the third section 85 of the door operating shaft assembly 59. There is sufficient angular difference between the contacting surfaces of the recess 82 and the protrusion 83 to allow the doors operated by the second section of the door operating shaft assembly 59 to be unlocked before the third section 85 of the door operating shaft assembly 59 begins to rotate.

This angular difference between the protrusions on the female coupling members and the recesses in the male coupling members is generally about 10 degrees, the contacting surfaces of the protrusion including an angle of about 60° and the contacting surfaces of the recess including an angle of about 70°. The successive matched sets of protrusions and recesses are arranged so that they are rotated around the axis of the longitudinal shaft through about 10°, one with respect to the one immediately following it. This feature, for instance, permits the unlocking of the set of doors 38–39 and 40–41, operated by the second section 80 and its counterpart 86 of the door operating shaft assembly 59 by rotation thereof of about 3°30′ thus allowing this set of doors to drop with continued rotation of the shaft through 6°30′ before the second set of doors operated by the third section 85 with its counterpart 92 of the door operating shaft assembly 59 begin to unlock. This in effect reduces the load on the door operator 60 which can conveniently be a 10 H.P. electric motor, during the unlocking phase of the cycle. The third set of doors is unlocked in a similar fashion. Thus, the door operating assembly makes it possible to utilize the power produced by the weight of the lading on the top of the first set of doors to assist the door operator 60 in unlocking and to open the second set of doors. Likewise the first two sets of doors assist the door operator 60 in unlocking and opening the last set of doors shown.

After contact is made between the recess 82 and the protrusion 83, the third section 85 of the door operating shaft assembly 59 rotates with the second section 80 and the first section 67 causing the door operating lever similar to 55 to rotate, thus unlocking the second set of hopper doors similar to 38–41 of the car 10.

The third section 85 of the door operating shaft assembly 59 is arranged with the male portion 87 of the third door operating shaft coupling 75 on the driving end. This male portion of the coupling has a pie-shaped recess 88, as shown in FIGURE 18, which fits over the pie-shaped protrusion 89, shown in FIGURE 20, in the female portion 90 of the third door operating shaft coupling 75 on the driven end of the fourth section 91 of the door operating shaft assembly 59. As stated before, there is sufficient angular difference between the contacting surfaces of the recess 88 and the protrusion 89 to allow the doors operated by the third section 85 of the door operating shaft assembly 59 to be unlocked before the fourth section 91 begins to rotate.

After contact is made between the recess 88 and the protrusion 89, the fourth section 91 rotates with the third section 85, the second section 80 and the first section 67 causing the door operating lever similar to 55 to rotate, thus unlocking the third and last set of hopper doors similar to door 38–41 of the car 10.

Immediately after the last set of doors are unlocked all of the twelve hopper doors in the bottom of the car fall open simultaneously. This free fall of the doors is made possible by the excess slack between the pie-shaped protrusion 78 in the female portion of the first door operating shaft coupling 73 and the protrusion 77 on the male portion 77 of the first door operating shaft coupling 73.

In like manner, the door operating shaft section counterparts to 67, 80, 85 and 91, namely 66, 86, 92 and 93, respectively, operate concurrently with them as also do the shaft coupling counterparts to 73, 74 and 75, namely, 70, 71 and 72, respectively, with component female part counterparts to 79, 84 and 90, namely, 94, 95 and 96, respectively, and component male part counterparts to 76, 81 and 87, namely 97, 98 and 99, respectively.

The door operator 60 can receive its source of power in various modes. For instance, a connection 100 as shown in FIGURES 1 and 2 may be provided near one end of the car 10 to which the source of power may be manually connected, thus energizing the door operator 60 and hence the locking and unlocking of the doors as described. Alternatively, or in addition, a connection 101 on the side of car 10 can be provided which automatically engages with a movable source of power at the track side installation, again energizing the door operator 60 and hence the locking and unlocking of the doors while the car moves along the track. As to this latter embodiment, the door operator 60 can be energized either automatically as the car rolls by the track side installation or remotely from a manually operated control station after connections are engaged between the car 10 and the track side installation. Also, the door operating shaft assembly 59 may also be actuated manually by a person applying torque at the end of cross shaft 65.

It should also be understood that the invention while described with reference to three sets of doors may also conveniently be employed with any number of such sets as for instance one or more as may be desired. It will also be understood that various other embodiments and modifications may be made and all such embodiments and modifications coming within the scope of the appended claims are embraced thereby.

What is claimed is:

1. A door operating mechanism connected to a door, said mechanism comprising means to lock and unlock said door, said means comprising a door operator connected to a cross shaft through a door operator shaft, said cross shaft connected to a door operating shaft through a right angle linkage, said door operating shaft comprising at least a first and second section, said first and second sections constituting a first door operating shaft coupling, said first section provided with a male portion in driving engagement with a female portion of said second section.

2. The door operating mechanism of claim 1 wherein the door operating shaft is provided with a plurality of sections, each section other than the said first section being provided with a female portion and a male portion, said male portion being in driving engagement with the female portion of the immediately succeeding section.

3. The door operating mechanism of claim 2 wherein said male portion of said first section is provided with a protrusion including an angle of about 180°, said protrusion engageable with and driving a female portion of said second section provided with a protrusion including an angle of about 60°.

4. The operating mechanism of claim 3 wherein sections other than said first section are provided with a female portion provided with a protrusion including an angle of about 60° and a male portion provided with a recess including an angle of about 70°.

5. The operating mechanism of claim 4 including four sections.

6. A door operating mechanism connected to a door, said mechanism comprising means to lock and unlock said door, said means comprising a door operator connected to a cross shaft through a door operator shaft, said cross shaft connected to a pair of door operating shafts through right angle linkages, each of said door operating shafts comprising at least a first and a second section, said first and second sections of each shaft constituting a first pair of door operating shaft couplings, said first section of each door operating shaft provided with a male portion in driving engagement with a female portion of said second section of each door operating shaft.

7. The door operating mechanism of claim 6 wherein each door operating shaft is provided with a plurality of sections, each section other than said first section being provided with a female portion and a male portion, said male portion being in driving engagement with the female portion of the immediately succeeding section of each door operating shaft, each such successive engagement on each of said door operating shaft constituting successive pairs of door operating shaft couplings.

8. The door operating mechanism of claim 7 wherein said male portion of said first section of each door operating shaft is provided with a protrusion including an angle of about 180°, said protrusion engageable with and driving a female portion of said second section of each door operating shaft provided with a protrusion including an angle of about 60°.

9. The operating mechanism of claim 8 wherein sections other than the first section of each door operating shaft are provided with a female portion provided with a protrusion including an angle of about 60° and a male portion provided with a recess including an angle of about 70°.

10. The operating mechanism of claim 9 including four sections on each door operating shaft.

11. In a hopper car the improvement which comprises a vehicle underframe in combination with a door operating mechanism said underframe comprising forward and rearward center draft sills, said sills having ends extending toward the longitudinal center of said vehicle; forward and rearward header sills fixedly attached to said ends of said forward and rearward center draft sills extending toward the longitudinal center of said vehicle; a pair of intermediate sills in spaced parallel relation secured to and separating said header sills and forming a door area at the longitudinal center of said car, said door area bounded by said intermediate sills and said header sills and being provided with at least a pair of doors extending longitudinally of the car, said doors hingedly fixed to opposite sides of each intermediate sill and connected to said door operating mechanism comprising means to lock and unlock doors in said door area, said means comprising a door operator connected to a cross shaft through a door operator shaft, said cross shafts connected to a pair of door operating shafts through a right angle linkage, each of said door operating shafts comprising at least a first and second section, said first and second section constituting a first door operating shaft coupling, said first section provided with a male portion in driving engagement with a female portion of said second section, said male portion provided with a protrusion including an angle of about 180°, said protrusion engageable with and driving said female portion provided with a protrusion including an angle of about 60° to lock and unlock said pair of doors.

12. In a hopper car the improvement which comprises a vehicle underframe in combination with a door operating mechanism, said underframe comprising forward and rearward center draft sills, said sills having ends extending toward the longitudinal center of said hopper car; forward and rearward header sills fixedly attached to said ends of said forward and rearward center draft sills extending toward the longitudinal center of said hopper car, a pair of intermediate sills in spaced parallel relation secured to and separating said header sills to form a door area at the longitudinal center of said hopper, a plurality of a pair of doors hingedly fixed to opposite sides of each intermediate sill and connected to said door operating mechanism comprising means to lock and unlock doors in said door area, said means comprising a door operator connected to a cross shaft connected to a door operating shaft through a right angle linkage, said door operating shaft comprising a plurality of sections, successive sections constituting a door operating shaft coupling, the first of said plurality of sections provided with a male portion in driving engagement with a female portion of a second section of said plurality of sections, said male portion provided with a protrusion including an angle of about 180°, said protrusion engageable with and driving said female portion provided with a protrusion including an angle of about 60°, each section other than said first section of said plurality of sections being provided with a female portion and a male portion, said male portion being in driving engagement with the female portion of the immediately succeeding section of each door operating shaft, each female portion provided with a protrusion including an angle of about 60° and a male portion provided with a recess including an angle of about 70° to lock and unlock successively said plurality of a pair of doors.

References Cited by the Examiner

UNITED STATES PATENTS

| | | | |
|---|---|---|---|
| 632,650 | 9/99 | Ingoldby | 105—240 |
| 1,415,097 | 5/22 | Kassler. | |
| 1,634,107 | 6/27 | Hosceit et al. | 105—243 |
| 1,665,388 | 4/28 | Willoughby | 105—250 |

LEO QUACKENBUSH, *Primary Examiner.*